Feb. 2, 1932. P. W. LEFFLAND 1,843,331

ILLUMINATED EMERGENCY BRAKE LEVER

Filed May 24, 1929

INVENTOR.

Paul W. Leffland

Patented Feb. 2, 1932

1,843,331

UNITED STATES PATENT OFFICE

PAUL W. LEFFLAND, OF DALLAS, TEXAS

ILLUMINATED EMERGENCY BRAKE LEVER

Application filed May 24, 1929. Serial No. 365,635.

By way of explanation I assume the emergency brake lever of an automobile or the like, to be the most urgent of the controls in case of emergency.

This present invention relates to improvements in emergency brake levers for vehicles, such as automobiles or the like, by constructing the lever so that the hand grip of same may be illuminated.

In accordance with this present invention I have designed an illuminated emergency brake hand grip which will serve to warn or remind the driver of a vehicle, should he be driving at an excessive speed, by illuminating the very object necessary in case of emergency, namely, the emergency brake lever hand grip.

With this and other objects in view, my invention consists in the arrangement, combination and construction of the various parts of my improved device, as described in the specifications, claimed in the claims, and illustrated in the appended drawings in which, Figure 1 is an elevation from the side of a type of my new and improved emergency lever hand grip, showing a hollow lever and electric wiring thru the hollowed lever.

Figure 1:
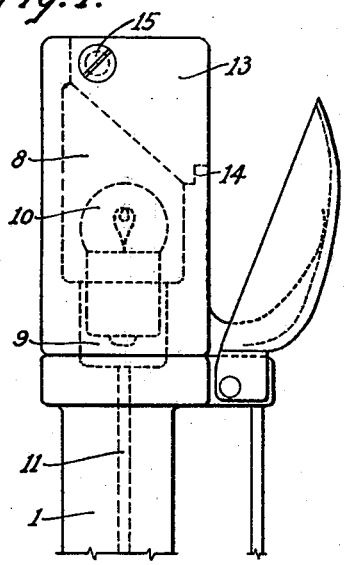
Figure 2:
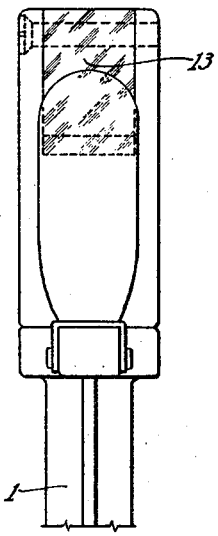
Figure 2 is an elevation from the back of Figure 1.

Referring to the drawings in detail, and specifically to Figures 1 and 2, 1 is an emergency brake lever well known for the major part of its construction. I make this lever hollow as at 11 and make the hand grip of the lever hollow as at 8. At the lower end of the hollow hand grip I fit a socket 9 to receive a lamp bulb 10. I connect electric wires to the socket 9 and run them thru the hollow lever as at 11 to connect with a source of current, of course, to light the bulb 10 at such time that the source of current is on. At the top and back side of the hollow hand grip is an opening, as shown in the drawings, which is match fitted to receive a glass cover 13, which is so shaped to form in part the hand grip. I have placed a stay lug 14 in conjunction with a similar lug on the bottom extremity of the glass cover and further I have placed a thru screw 15 at the top, said screw being received by threads in the side wall of the hand grip. These holding means serve to maintain the glass cover in place yet make the cover easily removable for accessibility to the lamp bulb.

Figure 3:
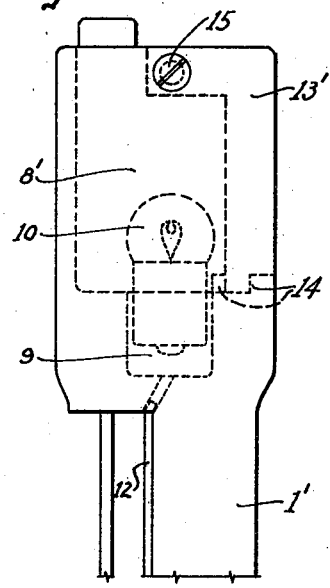
Figure 3 is an elevation from the side of another type of my new and improved emergency lever hand grip, showing a conduit along the lever and electric wiring thru the conduit.
Figure 4:
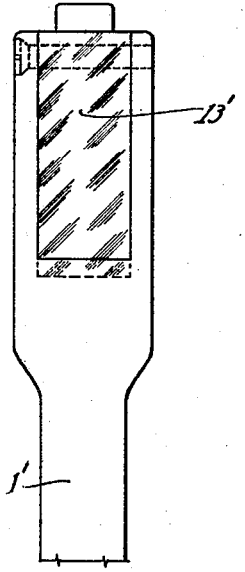
Figure 4 is an elevation from the back of Figure 3.

Referring specifically to Figures 3 and 4, 1' is another type of emergency brake lever also well known for the major part of its construction. Along the height of the lever I place a conduit 12, which may be fastened to the lever in any approved manner and which I fit into the bottom of the hand grip as shown toward the proximity of a socket 9 which I place at the bottom of a hollow which I provide in the hand grip denoted by 8'. I connect electric wires to the socket 9 and run them thru the conduit 12 to connect with a source of current, of course, to light a bulb 10 which I place in the socket, at such time that the source of current is on. At the top and back side of the hollow hand grip I provide an opening, as shown in the drawings, which is match fitted to receive a glass cover 13', which is so shaped to form in part the hand grip. This glass cover I extend, at the back side of the hand grip, the full height of the hollow in the grip in order to present to the driver of the vehicle a maximum view of the illumination from the hollow in which the light bulb is situated. I have placed the stay lug 14 and the thru screw 15 on this lever hand grip in the same manner and for the same purpose as specified for Figures 1 and 2.

I arrange the glass covers, denoted by 13 and 13', in order to present to the driver the best possible top and back view of the illumination, thru this transparency, from the bulb 10. I make these glass covers thick, as shown in the drawings, in order that they may have sufficient strength to properly serve their purpose and further in order that the driver may be presented with a soft light rather than a glaring light. The glass covers should be red in color, preferably.

While the parts and their arrangement and relation have been described more or less specifically it is obvious that various changes and alterations might be made in the general form and arrangement of the parts described without departing from the invention. Hence I do not limit myself to the details herein set forth, but shall consider myself at liberty to make such changes and alterations as do not depart from the spirit and scope of the appended claims.

I claim:

1. As a new article of manufacture, a vehicle emergency brake lever having a hollow hand grip at its upper end, a lamp socket supported within the hand grip, a lamp bulb in said socket, electric wires connecting said socket with a source of current; said hollow hand grip being provided with an opening in the top and side thereof, a glass cover for said opening; said cover being held in place at one extremity by a projection formed on the hand grip engaging a projection formed on the glass cover; the exterior surface of the glass cover forming in part the hand grip.

2. As a new article of manufacture, a vehicle emergency brake lever having a hollow hand grip at its upper end, a lamp socket supported within the hand grip, a lamp bulb in said socket, electric wires connecting said socket with a source of current; said hollow hand grip being provided with an opening in the top and side thereof, a glass cover for said opening: said cover being held in place at one extremity by a projection formed on the hand grip engaging a projection formed on the glass cover and held in place at the other extremity by a removable screw passing thru a side of the grip and the glass cover and match threaded to the other side of the grip; the exterior surface of the glass cover forming in part the hand grip.

In testimony whereof I affix my signature.

PAUL W. LEFFLAND.